(12) United States Patent
Geshi et al.

(10) Patent No.: US 10,658,636 B2
(45) Date of Patent: May 19, 2020

(54) POWER STORAGE DEVICE (71) Applicant: Panasonic Intellectual Property Management Co., Ltd., Osaka-shi, Osaka (JP)

(72) Inventors: Shinya Geshi, Osaka (JP); Takashi Hasegawa, Osaka (JP)

(73) Assignee: PANASONIC INTELLECTUAL PROPERTY MANAGEMENT CO., LTD., Osaka-shi (JP)

(*) Notice: Subject to any disclaimer, the term of this patent is extended or adjusted under 35 U.S.C. 154(b) by 59 days.

(21) Appl. No.: 15/781,870

(22) PCT Filed: Feb. 14, 2017

(86) PCT No.: PCT/JP2017/005213
§ 371 (c)(1),
(2) Date: Jun. 6, 2018

(87) PCT Pub. No.: WO2017/154478
PCT Pub. Date: Sep. 14, 2017

(65) Prior Publication Data
US 2018/0366699 A1 Dec. 20, 2018

(30) Foreign Application Priority Data
Mar. 10, 2016 (JP) ................. 2016-046460

(51) Int. Cl.
| H01M 2/10 | (2006.01) |
| H01M 10/6563 | (2014.01) |
| H01M 10/6566 | (2014.01) |
| H01M 10/613 | (2014.01) |
| H01M 10/6554 | (2014.01) |
| H01M 2/30 | (2006.01) |

(52) U.S. Cl.
CPC ....... *H01M 2/1077* (2013.01); *H01M 10/613* (2015.04); *H01M 10/6554* (2015.04); *H01M 10/6563* (2015.04); *H01M 10/6566* (2015.04); *H01M 2/305* (2013.01)

(58) Field of Classification Search
None
See application file for complete search history.

(56) References Cited

U.S. PATENT DOCUMENTS

| 2013/0029201 A1 | 1/2013 | Motohashi et al. |
| 2014/0017528 A1 | 1/2014 | Uehara et al. |
| 2015/0162651 A1 | 6/2015 | Nakahama et al. |

FOREIGN PATENT DOCUMENTS

| JP | 60-57060 U | 4/1985 |
| JP | 2011-222230 A | 11/2011 |
| JP | 2015-115167 A | 6/2015 |
| WO | 2012/132134 A1 | 10/2012 |

OTHER PUBLICATIONS

International Search Report dated Mar. 21, 2017, issued in counterpart application No. PCT/JP2017/005213. (2 pages).

*Primary Examiner* — Wyatt P McConnell
(74) *Attorney, Agent, or Firm* — Westerman, Hattori, Daniels & Adrian, LLP (57) ABSTRACT

A power storage device includes a plurality of battery modules, a rack for arranging and housing the plurality of battery modules, and a wall plate attached so as to close a back side-surface of the rack. The wall plate is transparent at least in part and is provided facing the connector terminal detachably connected to the battery module.

4 Claims, 7 Drawing Sheets

POWER STORAGE DEVICE

TECHNICAL FIELD

The present disclosure relates to a power storage device including a plurality of storage modules housed in a rack.

BACKGROUND ART

Conventionally, Patent Literature (PTL) 1 describes a power supply device in which a plurality of battery packs is respectively housed in housing spaces partitioned and formed in a rack. Each of the battery packs is constructed by combining a plurality of single cells. In this power storage device, when the battery packs are inserted and housed into housing spaces, respectively, output terminals disposed to rear surfaces of the battery packs are inserted into input terminals installed in the back of the housing spaces. Thus, the plurality of battery packs housed in the rack is connected to each other in series or in parallel at a rear surface side of the rack by connection leads connected between the input terminals.

CITATION LIST

Patent Literature

PTL 1: International Publication WO2012/132134

SUMMARY OF THE INVENTION

In a rack-type power storage device including a rack that houses a plurality of battery modules, in view of preventing an electric shock, it is preferable to install a rear plate so that connector terminals and cables connected to the battery modules are not exposed at a rear surface side of the rack. However, when the rear plate is installed, a connection state of the connector terminals to the battery packs cannot be monitored from the outside.

An object of the present disclosure is to provide a power storage device including a plurality of battery modules housed in a rack, wherein while contact with connector terminals of the battery modules or cables for connecting between the connector terminals is prevented, the connection state of the connector terminals or the cables can be monitored from the outside A power storage device of the present disclosure includes a plurality of battery modules; a rack for arranging and housing the plurality of battery modules; and a wall plate attached to one side-surface of the rack, provided facing a connector terminal that is detachably connected to each of the battery modules, and being transparent at least in part.

According to a power storage device of the present disclosure, a wall plate is attached to one side-surface of a rack so as to face a connector terminal connected to each battery module. This configuration can prevent careless contact with the connector terminal, thus improving the safety of the power storage device. Furthermore, since at least a part of the wall plate is transparent, a connection state of the connector terminal to the battery module can be monitored from the outside of the rack.

DESCRIPTION OF EMBODIMENTS

Hereinafter, an exemplary embodiment in accordance with the present disclosure is described in detail with reference to the attached drawings. In this description, specific shapes, materials, numerical values, directions, and the like, are just examples for easy understanding of the present disclosure, and can be appropriately changed depending on applications of use, purposes, specifications, and the like. Furthermore, in the following, a plurality of exemplary embodiments, modifications, and the like, are included, characteristics thereof are expected to be appropriately combined and used from the beginning.

Hereinafter, in FIG. 1 and other drawings, a direction shown by an arrow X showing one horizontal direction is referred to as a "width direction," a horizontal direction shown by arrow Y showing a direction perpendicular to the direction shown by the arrow X is referred to as a "length direction," and a direction shown by an arrow Z showing a direction perpendicular to the arrows X and Y is referred to as a "vertical direction" or a "height direction". Furthermore, with reference to the length direction, one side is referred to as "front" and the other side is referred to as "back".

Figure 1:
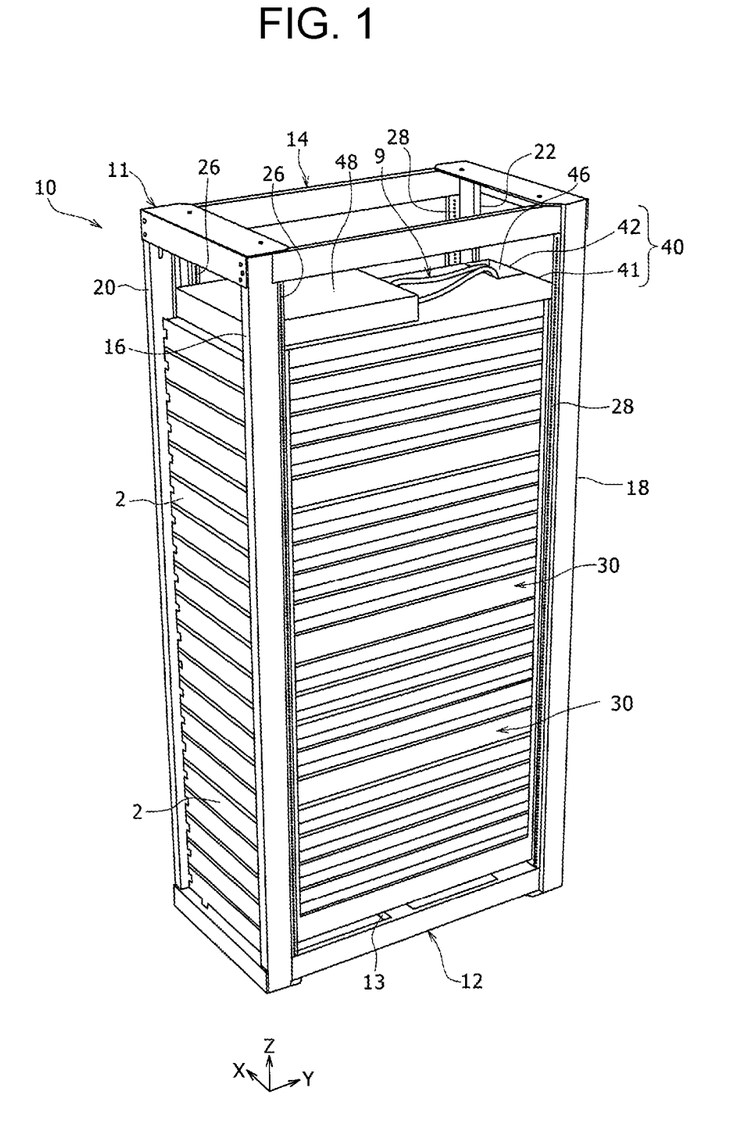
FIG. 1 is a perspective view showing a power storage device seen from a front side in accordance with one exemplary embodiment of the present disclosure.
Figure 2:
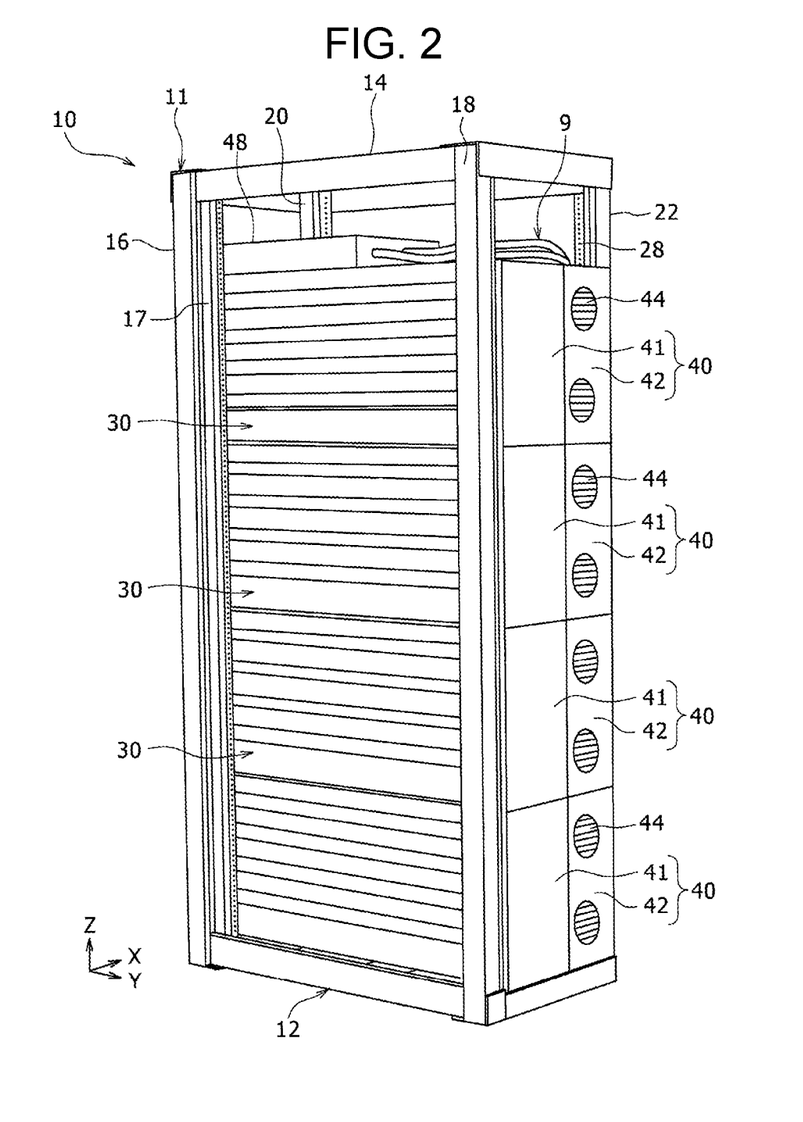
FIG. 2 is a perspective view of the power storage device seen from a back side.
Figure 3:
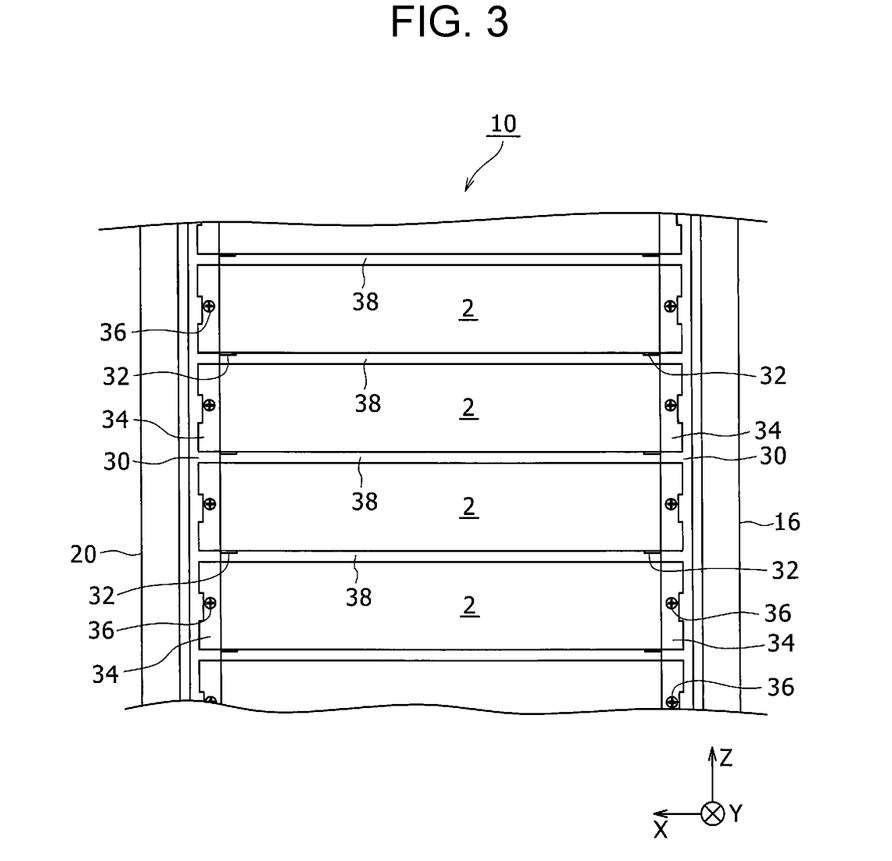
FIG. 3 is a partial front view of the power storage device.

FIG. 1 is a perspective view showing power storage device 10 seen from the front side in accordance with one exemplary embodiment of the present disclosure. FIG. 2 is a perspective view of power storage device 10 seen from the back side. FIG. 3 is a partial front view of power storage device 10.

As shown in FIG. 1, power storage device 10 is constructed by housing a plurality of storage cells 2 in rack 11. This exemplary embodiment shows an example in which, for example, twenty battery modules 2 are arranged at a predetermined interval in the vertical direction and housed in rack 11. However, the number of battery modules 2 to be housed in one rack 11 is not necessarily limited to this. The number may be appropriately changed depending on an outer dimension and rated capacity of each battery module 2.

As shown in FIGS. 1 and 2, rack 11 includes bottom frame portion 12, ceiling frame portion 14, as well as four support posts 16, 18, 20, and 22. As rack 11, a standard rack, for example, a 19-inch rack, can be used. It is preferable that rack 11 has such strength as to be endurable when a large amount of heavy battery modules 2 are housed. A rack made of, for example, steel can be suitably used.

Both bottom frame portion 12 and ceiling frame portion 14 are formed in rectangular frame shapes, respectively. Bottom frame portion 12 may be made by coupling four bottom frames using a fastening member such as a bolt, or may be formed unitarily with each other in advance. Furthermore, reinforcement frame 13 is disposed in the middle of bottom frame portion 12 along the width direction. Both ends of reinforcement frame 13 are coupled to bottom frame portion 12 by a fastening member such as a bolt.

In this exemplary embodiment, similar to bottom frame portion 12, ceiling frame portion 14 may be made by coupling four bottom frames using a fastening member such as a screw and a bolt, or may be formed unitarily with each other in advance. Note here that, this exemplary embodiment shows an example in which ceiling frame portion 14 does not include a ceiling plate, but the configuration is not necessarily limited to this. In order to reduce deposition of dust, and the like, a ceiling plate for closing the upper surface of ceiling frame portion 14 may be provided as a separate member, or a ceiling plate may be unitarily formed. Furthermore, similar to bottom frame portion 12, also in ceiling frame portion 14, a reinforcement frame may be provided in the middle so as to enhance the strength of a frame structure body.

Four support posts 16, 18, 20, and 22 are provided to stand corresponding to four corner portions of bottom frame portion 12 and ceiling frame portion 14. Each of support posts 16, 18, 20, and 22 is a long member extending along the vertical direction. For example, angle members whose cross sectional shape is L-shaped or rectangular U-shaped are used. Furthermore, the lower and upper ends of support posts 16, 18, 20, and 22 are fastened to bottom frame portion 12 and ceiling frame portion 14 by, for example, fastening members such as a screw and a bolt, respectively. Thus, bottom frame portion 12, ceiling frame portion 14, and four support posts 16, 18, 20, and 22 constitute a frame structure body including frame portions corresponding to twelve sides of the rectangular parallelepiped.

Two support posts 16 and 20, which are located in the front among the four support posts are provided with a large number of attachment holes 26 with a predetermined pitch along the vertical direction. Furthermore, two support posts 18 and 22, which are located in the back side in rack 11 are provided with a large number of attachment holes 28 with a predetermined pitch. Hereinafter, two support posts 16 and 20 of rack 11 may be referred to as a front support post, and the other two support posts 18 and 22 may be referred to as a back support post.

Side panel 30 is attached to rack 11. Side panel 30, in one side-surface in the width direction X, has a front end portion fixed to attachment hole 26 of front support post 16 by, for example, a screw (not shown), and has a back end portion fixed to attachment hole 28 of back support post 18 by, for example, a screw (not shown).

Although not shown in the drawings, side panel 30 is attached to the other side-surface in the width direction of rack 11. Side panel 30 has a front end portion fixed to attachment hole 26 of front support post 20 by, for example, a screw (not shown), and has a back end portion fixed to attachment hole 28 of back support post 22 by, for example, a screw (not shown).

This exemplary embodiment shows an example in which four side panels 30 are attached to both sides in the width direction of rack 11, respectively. Furthermore, each side panel 30 is formed of, for example, a metal plate, and rack 11 has support portion 32 bent along the horizontal direction in such a manner that it protrudes to the inner side of the width direction. Each side panel 30 is provided with, for example, five support portions 32, respectively.

Support portions 32 of side panel 30 attached to both sides in the width direction of rack 11 are disposed such that support portions 32 protrude in the same height. Thus, battery module 2 is inserted from the front side of rack 11, and mounted on two support portions 32 at both sides in the width direction, so that flat rectangular parallelepiped-shaped battery module 2 is housed in a horizontal state. In this way, rack 11 can house twenty battery modules 2 corresponding to the number of support portions 32 of side panel 30.

In this way, in rack 11 of this exemplary embodiment, since side panels 30 formed of a metal plate are provided between front support posts 16 and 20 and back support posts 18 and 22, the structural strength of rack 11 is improved. Therefore, a large number of heavy battery modules 2 can be housed in the vertical direction.

As shown in FIG. 3, fixing part 34 is attached to both sides in the width direction of the front side surface of battery module 2 by, for example, welding. Battery modules 2 housed in rack 11 are fixed to rack 11 by inserting screws 36 into through-holes of fixing part 34 and fastening them to female screw holes formed in side panel 30.

Furthermore, gap 38 that opens toward the front surface side of rack 11 is formed between battery modules 2 housed and fixed to rack 11. Both sides in the width direction of gap 38 are closed by a metal plate constituting side panel 30. Gap 38 functions as a cooling passage for allowing air, sucked from the front surface side of rack 11 by action of a fan mentioned below, to flow.

With reference to FIGS. 1 and 2 again, rear plate (wall plate) 40 is attached to the back surface (one side surface) of rack 11. Rear plate 40 in this exemplary embodiment is made of back panel 41 and fan panel 42.

Back panel 41 is installed facing a portion that does not face the connector terminal connected to a case of battery module 2 as mentioned below. Back panel 41 is suitably made of, for example, a metal plate. In this way, when a part of rear plate 40 is made of a metal plate that generally has higher rigidity as compared with a resin plate, the strength of rear plate 40 can be improved. Back panel 41 is attached to a back wall surface of side panel 30 by, for example, a screw, at one end portion in the width direction, and attached to fan panel 42 by, for example, a screw at the other end portion in the width direction.

Furthermore, it is preferable that back panel 41 is divided into a plurality of sections in the vertical direction. This exemplary embodiment shows an example in which back panel 41 is divided into four sections corresponding to side panels 30. The configuration of dividing back panel 41 in this way has advantages of making it easy to attach back panel 41 to rack 11. However, a configuration is not necessarily limited to this, and one back panel elongated in the vertical direction may be used.

Fan panel 42 is a wall plate which is transparent at least in part. Fan panel 42 is provided facing the connector terminal connected to battery module 2 as mentioned below. Fan panel 42 is connected to back panel 41 by, for example, a screw at one end portion in the width direction, and is attached to attachment hole 28 of back support post 22 by, for example, a screw at the other end portion in the width direction.

Similar to back panel 41, fan panel 42 is preferably divided into a plurality of sections in the vertical direction. Dividing fan panel 42 in this way has advantages of making it easy to attach fan panel 42 to rack 11. However, a configuration is not necessarily limited to this configuration, and one fan panel elongated in the vertical direction may be used.

Furthermore, as shown in FIG. 2, two each of fans 44 are attached to each of four divided fan panels 42. When fan 44 is operated, air is sucked and introduced from the front side into gap 38 between battery modules 2 housed in rack 11.

Then, the air flows toward the back side inside gap 38, and is exhausted from fan 44. In this way, when the air flows along the upper surface and lower surface of battery module 2, battery module 2 is cooled.

Figure 4:
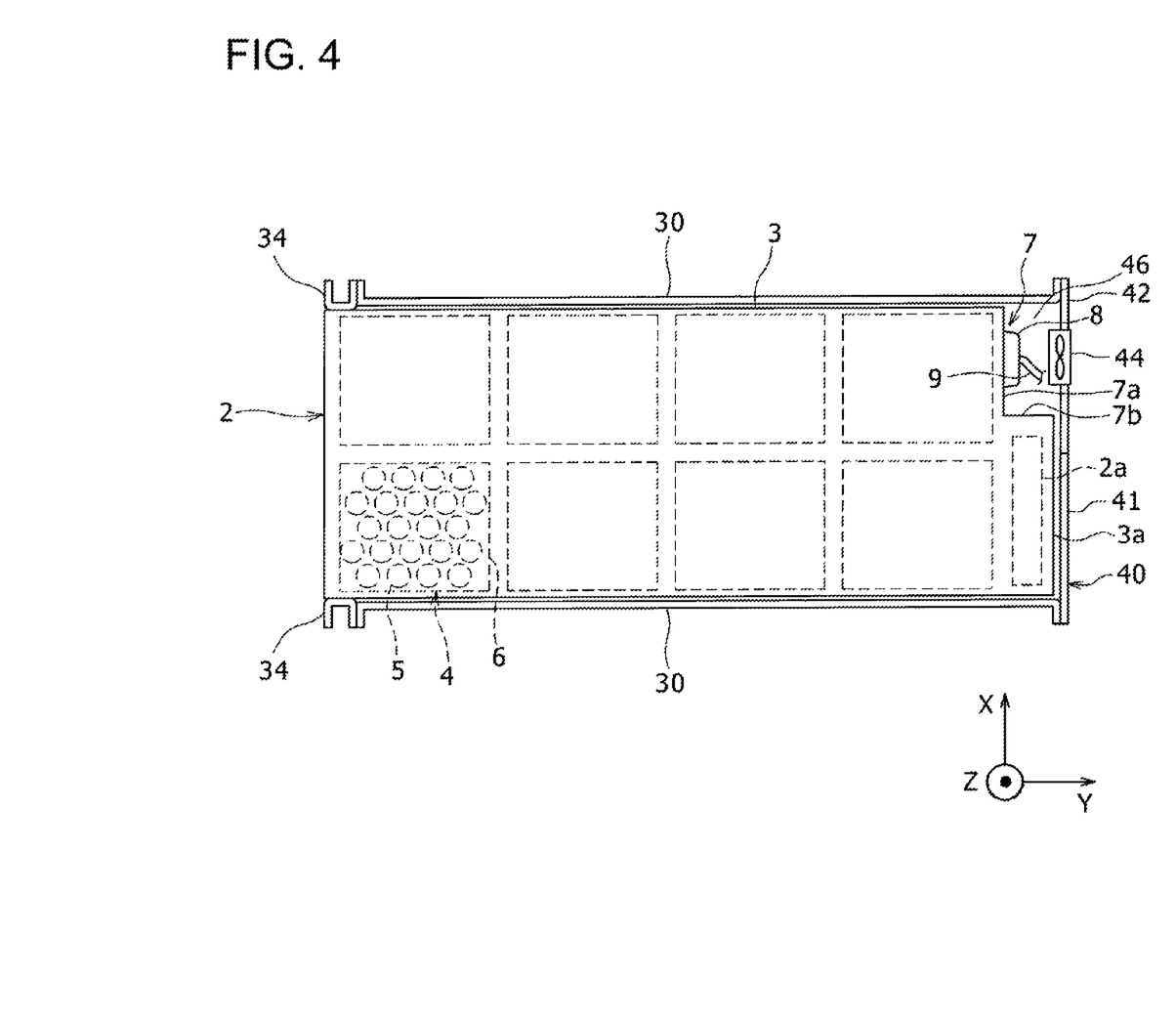
FIG. 4 is a top view showing one battery module housed in a rack.

FIG. 4 is a top view showing one battery module 2 housed in rack 11. As shown in FIG. 4, battery module 2 includes case 3 whose upper surface has a substantially rectangular shape elongated in the forward-and-backward direction. Case 3 is formed in a flat shape as shown in FIGS. 1 to 3. Case 3 is made of, for example, an enclosure or a housing made of metal or resin.

A plurality of battery blocks 4 are housed in case 3. This exemplary embodiment shows an example of battery module 2 in which eight battery blocks 4 are aligned and housed. Each battery block 4 holds a large number of single cells 5 in a state in which they are aligned by holder 6 made of metal or resin.

Single cells 5 included in battery block 4 are connected to each other in parallel. Furthermore, battery blocks 4 included in battery module 2 are connected to each other in parallel, in series, or in combination of series connection and parallel connection. As single cell 5, for example, a lithium-ion secondary cell is suitably used. Note here that single cell 5 is not necessarily limited to a cylindrical secondary battery, and it may be a rectangular secondary battery.

Cut-away portion 7 is formed in a part of case 3. Cut-away portion 7 is formed in a substantially flat rectangular-parallelepiped shape in one corner portion of the back side in the longitudinal direction Y of case 3. Cut-away portion 7 is formed in such a manner that it is cut away in a substantially rectangular shape seen in a plan view. Cut-away portion 7 includes side wall surface 7a facing fan panel 42 to which fan 44 is attached, and side wall surface 7b facing side panel 30. Thus, cut-away portion 7 formed in case 3 of battery module 2 defines duct space 46 together with fan panel 42 and side panel 30. Duct space 46 is formed extending in the vertical direction of rack 11.

In battery module 2, connector terminal 8 is connected to side wall surface 7a forming cut-away portion 7. Connector terminal 8 is electrically connected to each single cell 5 included in each battery block 4 housed in case 3. Cables 9 extend from connector terminal 8. Cables 9 include an electric power cable for inputting/outputting electric power, and a signal cable for outputting each detection signal of a voltage sensor, a current sensor and a temperature sensor (any of them are not shown) installed in case 3 of battery module 2. Cables 9 are electrically connected, for example, in series, between adjacent battery modules 2, and wired upward inside duct space 46 and connected to a controller mentioned later. Connection of cable 9 between battery modules 2 is carried out by connecting each terminal of cable 9 to connector terminal 8 corresponding to each battery module 2.

Control substrate 2a is housed in case 3 of battery module 2. Control substrate 2a has a function of controlling input-output power of battery module 2 or monitoring the battery state, and the like. Control substrate 2a is disposed at the back-side end portion in the length direction Y inside case 3 at the other corner side at which cut-away portion 7 is not formed. In this way, when control substrate 2a is disposed avoiding cut-away portion 7, so that a space in case 3 is effectively utilized, the size of battery module 2 can be reduced.

Referring to FIGS. 1 and 2 again, controller 48 is installed in the upper part of power storage device 10. Controller 48 can be installed on the upper surface of battery module 2 that is housed in the uppermost part in rack 11. Cable 9 is connected to controller 48. Cable 9 extends from the upper opening portion of duct space 46. This enables controller 48 to control input and output of electric power of each battery module 2 included in power storage device 10. Furthermore, controller 48 can monitor a state of each battery module 2 based on detection signals, for example, a voltage, an electric current, and a temperature transmitted from battery module 2 via cable 9.

Figure 5:
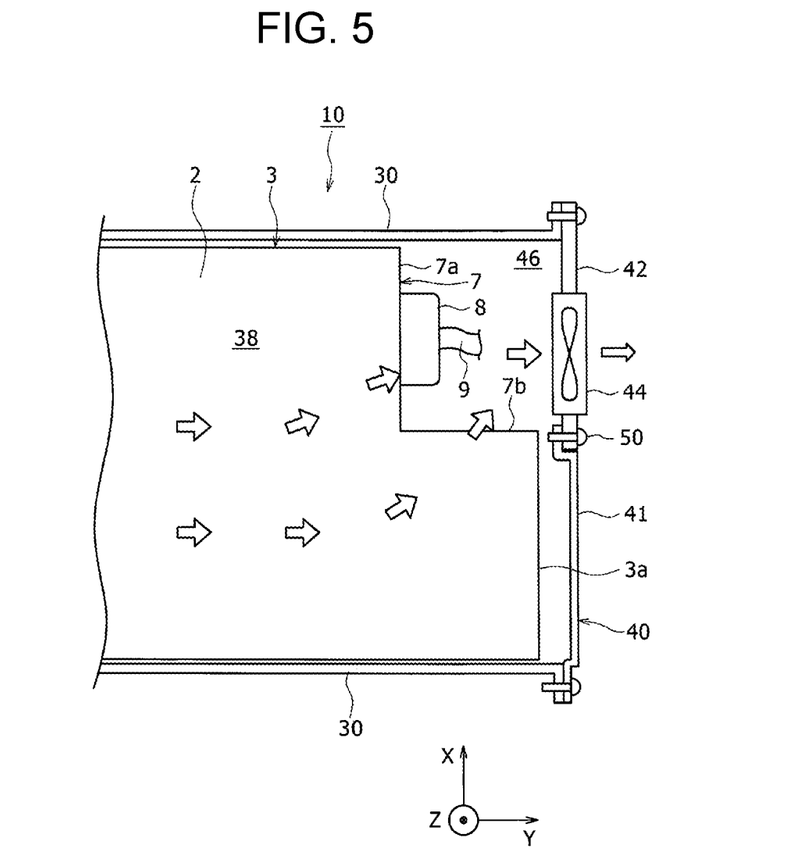
FIG. 5 is an enlarged view showing a back end side of the battery module in FIG. 4.

FIG. 5 is an enlarged view showing a back end side of battery module 2 in FIG. 4. As shown in FIG. 5, rear plate 40 attached to the back surface of rack 11 includes back panel 41 made of a metal plate, and fan panel 42 that is transparent at least in part, as mentioned above. Fan panel 42 is installed facing connector terminal 8 connected to battery module 2. Back panel 41 is installed facing a portion to which connector terminal 8 is not connected, that is, facing back wall surface 3a of case 3. Back panel 41 and fan panel 42 are connected to each other by screw 50 at substantially a center in the width direction.

Void arrows in FIG. 5 show a flow of air generated in gap 38 formed between a plurality of battery modules 2 housed in rack 11 when fan 44 is operated. When fan 44 is operated, air is sucked from the opening portion at the front side of gap 38 and the air flows. Furthermore, the both sides in the width direction of gap 38 are closed by side panels 30. Therefore, the air flowing into gap 38 flows to the back side along the upper surface and the lower surface of case 3 of each battery module 2 so as to cool battery module 2 during this time.

Back panel 41 constituting a part of rear plate 40 is formed of a metal plate that is not provided with an opening. Therefore, the air flowing to the back side in gap 38 is regulated by back panel 41, and thereby flows toward fan panel 42. In this meaning, rear plate 40 functions as a restricting plate for restricting the flow of air to cool battery module 2.

Then, the air that has flown toward the back side in gap 38 between battery modules 2 flows into duct space 46 partitioned by cut-away portion 7, and exhausted therefrom to the outside via fan 44.

Fan panel 42 constituting a part of rear plate 40 is an installation portion of fan 44. Furthermore, fan panel 42, together with cut-away portion 7 and side panel 30 of battery module 2, partitions and forms duct space 46. In this exemplary embodiment, fan panel 42 is suitably made of, for example, transparent plates such as an acrylic plate and a polycarbonate plate. In this way, transparent fan panel 42 is installed facing connector terminal 8 that is connected to side wall surface 7a forming cut-away portion 7 of case 3 in battery module 2.

In this way, when fan panel 42 of wall plate 40 is provided facing connector terminals 8 respectively connected to battery modules 2, it is possible to prevent careless contact with electrical connection portions of connector terminals 8 and cables 9. Thus, safety of power storage device 10 is improved. Furthermore, since fan panel 42 excluding an attachment portion of fan 44 is transparent, it is possible to easily monitor the connection state of connector terminal 8 to battery module 2 from the outside. Specifically, a person may monitor or check whether the connection state of connector terminal 8 is complete or not by visual observation from the outside of power storage device 10. Alternatively, since heat is generated when the connection state of connector terminal 8 is not complete, temperatures of connector terminal 8 may be monitored by using, for example, thermography via fan panel 42.

In addition, in long-time use, deposition of dust in an electrical connection portion of connector terminal 8 and cable 9, or in an electrical connection portion of fan 44 can be checked through transparent fan panel 42. Thus, the maintenance property is improved.

Herein, fan panel 42 is preferably formed of a colorless and transparent plate material, but the material is not necessarily limited to this. Fan panel 42 may be colored transparent or may be semitransparent as long as a connection state of connector terminals 8 and cables 9 can be monitored from the outside.

Figure 6:
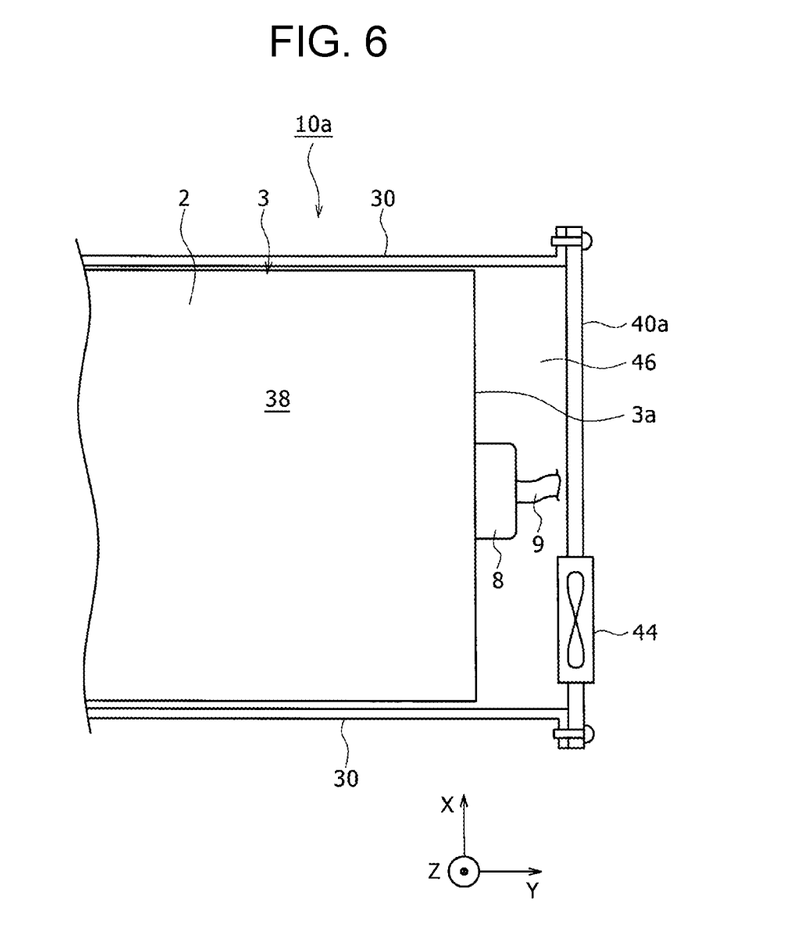
FIG. 6 is a top view, the same as FIG. 4, showing a modified example of a power storage device.

FIG. 6 is a view, which is the same view as FIG. 4, showing a modified example of a power storage device. As shown in FIG. 6, in power storage device 10a, a cut-away portion is not formed in back end portion of case 3 of battery module 2. Therefore, case 3 of battery module 2 has a rectangle shape seen from the upper part. Furthermore, connector terminal 8 is connected to the center position in the width direction of battery module 2.

Rear plate 40a in power storage device 10a is made of a transparent resin plate continuing in the width direction. Rear plate 40a may be divided into a plurality of sections in the vertical direction. Furthermore, fan 44 is installed in rear plate 40a. Fan 44 is preferably attached to a position avoiding a position facing connector terminal 8, specifically, a positon near to one end side in the width direction of battery module 2. This facilitates monitoring of the connection state of connector terminal 8. In addition, even in power storage device 10a, since rear plate 40a is attached in a state in which a back surface of rack 11 housing battery modules 2 is closed, rear plate 40a functions as a restricting plate for restricting the flow of air generated by the operation of fan 44.

Figure 7:
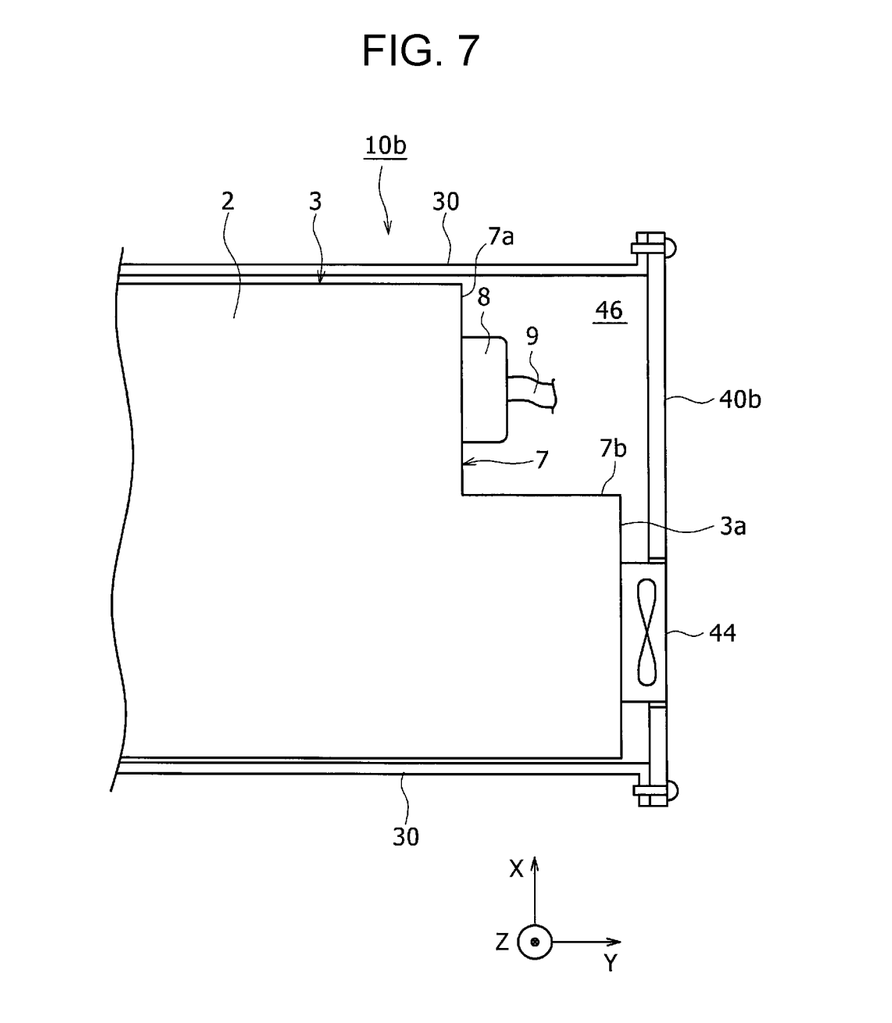
FIG. 7 is a top view, the same as FIG. 4, showing another modified example of a power storage device.

FIG. 7 is a view showing another modified example of a power storage device, which is the same view as FIG. 4. As shown in FIG. 7, in power storage device 10b, fan 44 is attached to back wall surface 3a of case 3 of battery module 2. Fan 44 is exposed to the back side via an opening portion of rear plate 40b made of a transparent resin plate.

In this case, by the operation of fan 44, a flow of air is generated in side case 3 of battery module 2. Therefore, battery block 4 included in battery module 2 can be cooled more effectively. Furthermore, in this case, since a gap as an air passage may not be formed between a plurality of battery modules 2 housed in rack 11, a large number of battery modules 2 can be housed in rack 11. Thus, since the number of battery modules 2 is increased in the same installation space, the energy density of the power storage device can be increased.

Note here that the power storage device of the present invention is not necessarily limited to the above-mentioned embodiment and the modified examples, and various modifications and improvements can be carried out.

For example, in the above, example in which rear plates 40, 40a, and 40b are made of a resin plate which is entirely or partially transparent is described. However, a configuration of the rear plate is not limited to this. A rear plate is made of one or a plurality of metal plates unitarily continuing in the width direction of the power storage device, and, is provided with, for example, a rectangular-shaped opening portion in a portion facing the connector terminal of the metal plate, into which a transparent resin plate, a glass plate, and the like, are fitted so as to form a window portion.

Furthermore, in the above, an example in which a wall plate is installed in the back side of power storage device 10 is described. However, when a connector terminal is connected to a front surface or a side surface of a battery module housed in rack 11, the wall plate may be installed on the front surface or the side surface of the power storage device.

Furthermore, in the above, an example in which power storage device 10 uses a rack housing a plurality of battery modules arranged in the vertical direction is described. However, power storage device 10 may use a rack housing a plurality of battery modules arranged in the right-and-left direction. When rear plate 40 is constructed by back panel 41 and fan panel 42 using such a rack, back panel 41 and fan panel 42 are disposed in the vertical direction, back panel 41 is preferably divided into a plurality of sections in the right-and-left direction.

The invention claimed is:

1. A power storage device comprising:
   a plurality of battery modules;
   a rack for arranging and housing the plurality of battery modules; and
   a wall plate attached to one side-surface of the rack, and
   a fan for generating a flow of air to cool the battery module attached to the wall plate, the wall plate facing a connector terminal detachably connected to each of the battery modules, and being transparent at least in part,
   wherein the wall plate includes
      a transparent resin plate that faces the connector terminal, being made of a transparent plate material, and
      a metal plate that does not face the connector terminal, being made of a metal plate, and
      the fan is attached to the transparent resin plate.

2. The power storage device according to claim 1, wherein the wall plate functions as a restricting plate for restricting the flow of air.

3. A power storage device comprising
   a plurality of battery modules;
   a rack for arranging and housing the plurality of battery modules; and
   a wall plate attached to one side-surface of the rack, facing a connector terminal detachably connected to each of the battery modules, and being transparent at least in part,
   wherein a cut-away portion is formed in each of the battery modules at a connection position at which the connector terminal is connected, and the connector terminal and a cable extending from the connector terminal are housed in a space defined by the cut-away portion and the wall plate.

4. The power storage device according to claim 1, wherein the transparent resin plate and the metal plate are divided into a plurality of sections, in a direction arranging the plurality of battery modules.

* * * * *